United States Patent
Yoshida et al.

(10) Patent No.: US 9,558,065 B2
(45) Date of Patent: Jan. 31, 2017

(54) MEMORY SYSTEM INCLUDING CACHE

(71) Applicant: Kabushiki Kaisha Toshiba, Minato-ku, Tokyo (JP)

(72) Inventors: Hideki Yoshida, Kanagawa (JP); Shinichi Kanno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 14/722,848

(22) Filed: May 27, 2015

(65) Prior Publication Data

US 2016/0224415 A1 Aug. 4, 2016

Related U.S. Application Data

(60) Provisional application No. 62/110,779, filed on Feb. 2, 2015.

(51) Int. Cl.
*G11C 29/00* (2006.01)
*G06F 11/10* (2006.01)
*G06F 3/06* (2006.01)

(52) U.S. Cl.
CPC .......... *G06F 11/1064* (2013.01); *G06F 3/064* (2013.01); *G06F 3/0619* (2013.01); *G06F 3/0673* (2013.01)

(58) Field of Classification Search
CPC .... G06F 11/16; G06F 11/1064; G06F 3/0619; G06F 3/064; G06F 2212/7203; G06F 2212/202; G11C 29/52
See application file for complete search history.

(56) References Cited

U.S. PATENT DOCUMENTS

| | | | | |
|---|---|---|---|---|
| 7,954,037 B2* | 5/2011 | Lasser | ................ | G06F 11/1068 714/763 |
| 8,607,120 B2* | 12/2013 | Song | ................... | G06F 11/1072 714/763 |
| 2011/0238908 A1 | 9/2011 | Kurita | | |
| 2012/0284587 A1* | 11/2012 | Yu | ......................... | G06F 3/0608 714/773 |
| 2013/0042053 A1 | 2/2013 | Huang | | |
| 2013/0198577 A1* | 8/2013 | Oh | ........................ | H03M 13/05 714/704 |
| 2013/0246688 A1 | 9/2013 | Kanno et al. | | |

FOREIGN PATENT DOCUMENTS

| | | |
|---|---|---|
| JP | 5434738 B2 | 3/2014 |
| JP | 2014-182674 A | 9/2014 |

* cited by examiner

*Primary Examiner* — Shelly A Chase
(74) *Attorney, Agent, or Firm* — White & Case LLP

(57) ABSTRACT

According to one embodiment, a memory system comprises a first storage device containing a nonvolatile semiconductor memory and a controller configured to control the first storage device. Data from a data processor is written to the first storage device, the data is written to a second storage device. The controller transmits information indicating that data to be read is absent in the first storage device to the data processor when a read error occurs, the read error disables reading of data from the first storage device in response to a read request supplied from the data processor.

13 Claims, 6 Drawing Sheets

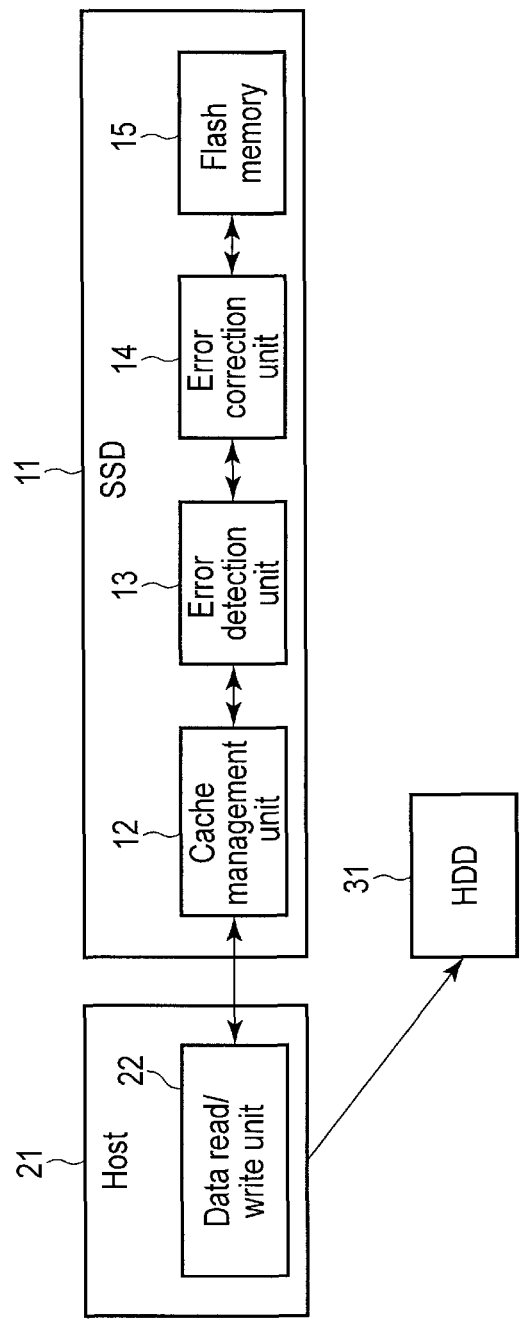
F I G. 1

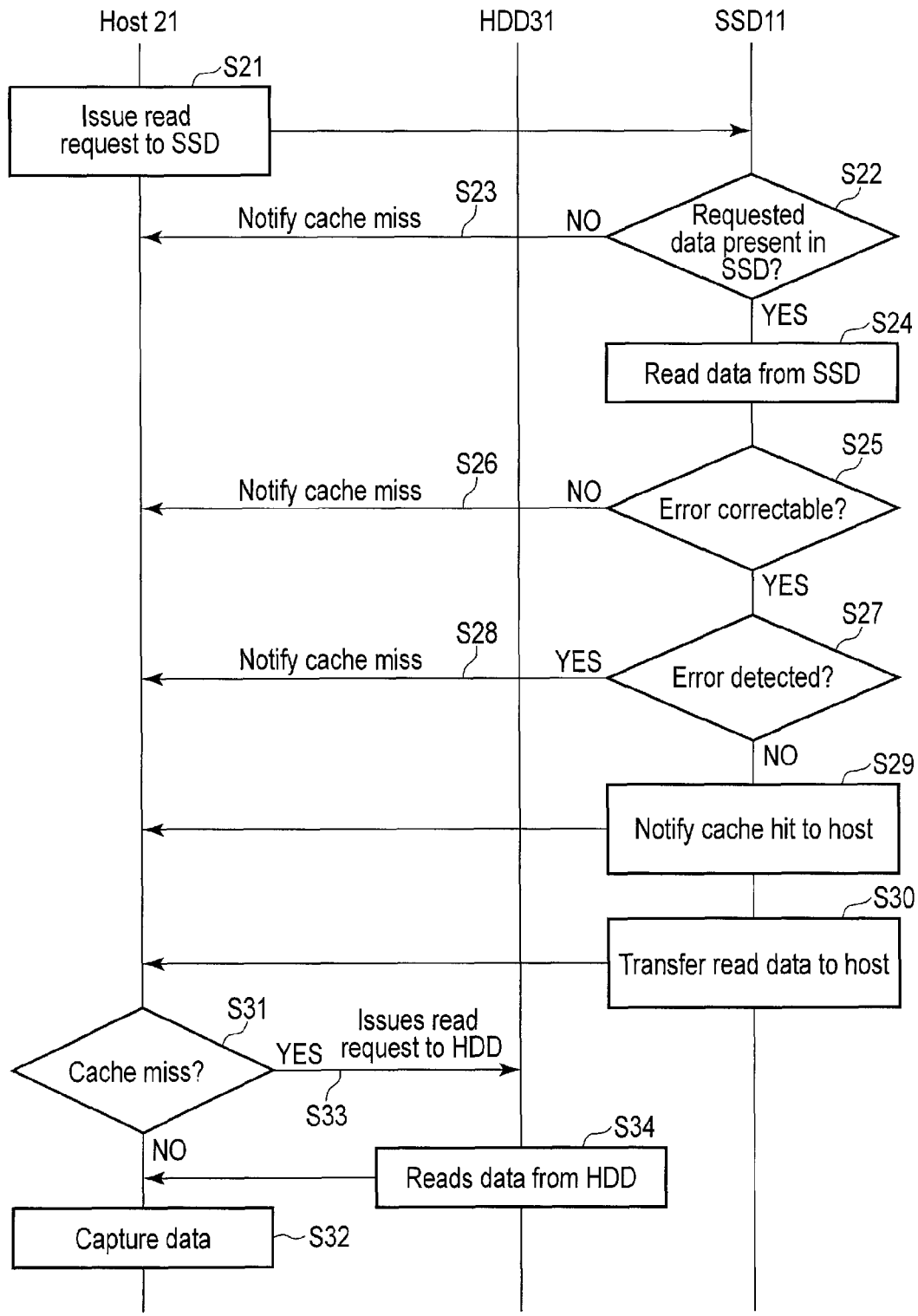
F I G. 5

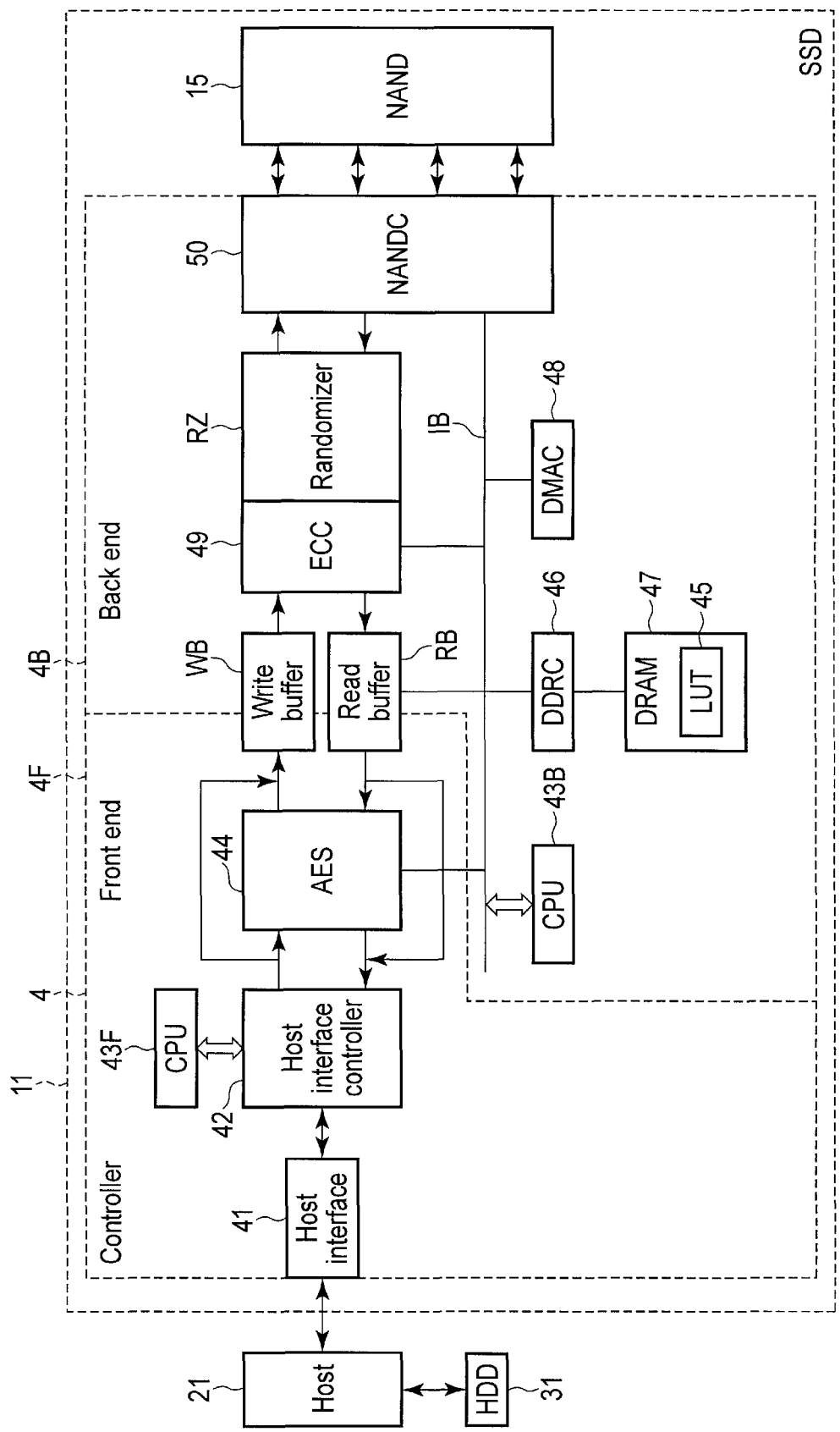
F I G. 6

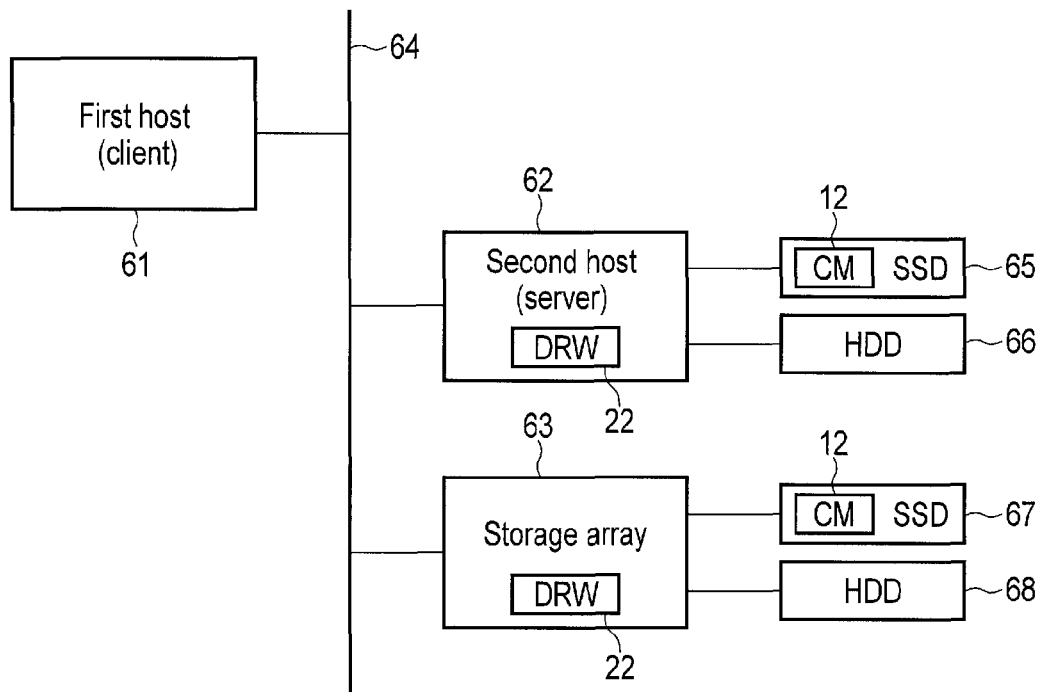
F I G. 7
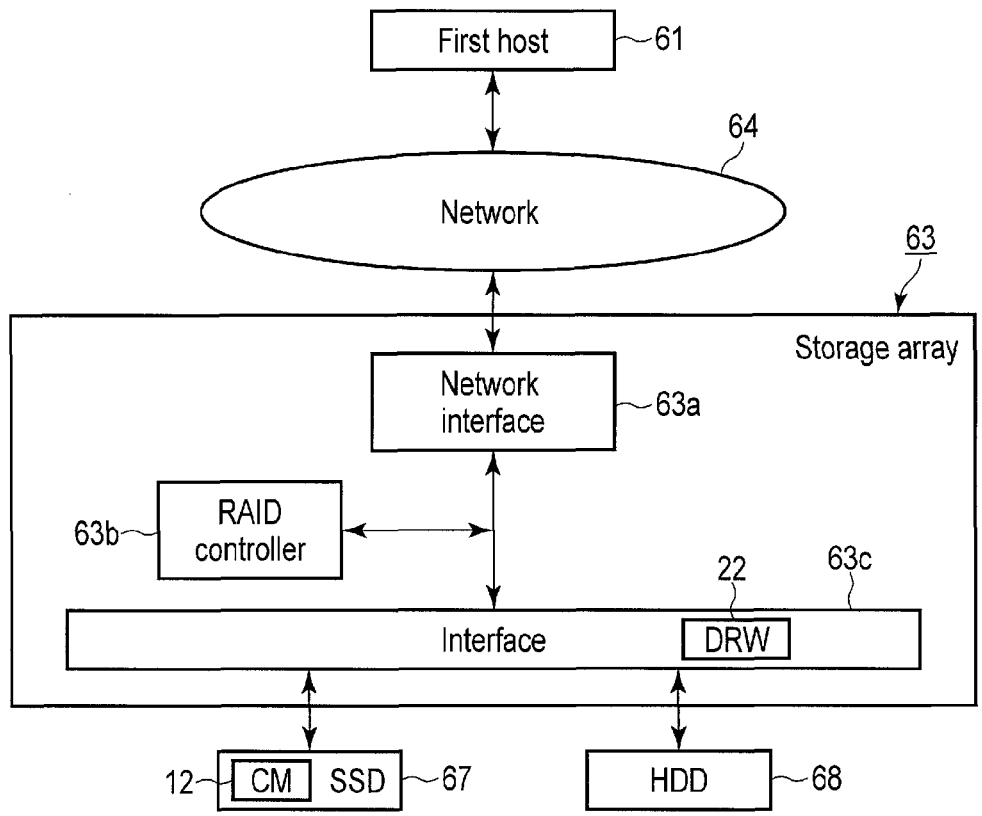
F I G. 8

MEMORY SYSTEM INCLUDING CACHE

CROSS-REFERENCE TO RELATED APPLICATIONS

This application claims the benefit of U.S. Provisional Application No. 62/110,779, filed Feb. 2, 2015, the entire contents of which are incorporated herein by reference.

FIELD

Embodiments described herein relate generally to a memory system using a solid-state drive (SSD) as a cache.

BACKGROUND

An SSD using a NAND flash memory acting as a non-volatile memory, which can be used as an external storage device for connection to a data processor such as a computer, has been developed.

An SSD can also be used as cache memory of a hard disk drive (HDD) and the like.

BRIEF DESCRIPTION OF THE DRAWINGS

FIG. 1 is a schematic diagram showing an example of a memory system to which this embodiment is applied.

FIG. 5 is a sequence chart illustrating a read process of this embodiment.

FIG. 6 is a block diagram showing an example of an SSD applied to the memory system of this embodiment.

FIG. 7 is a schematic diagram showing a modification of this embodiment.

FIG. 8 is a schematic diagram showing a structure of a part of the modification shown in FIG. 8.

DETAILED DESCRIPTION

Figure 2A:
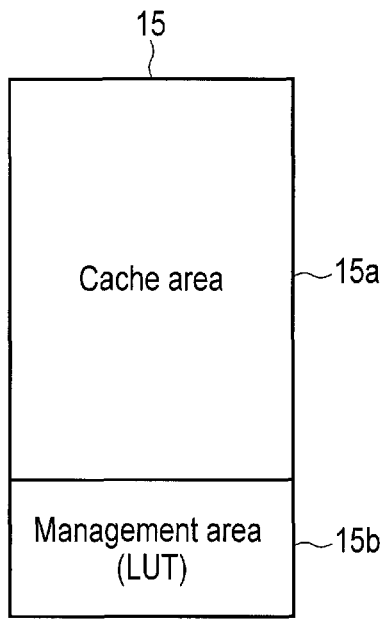
FIG. 2A is a schematic diagram showing an example of a memory area of the SSD shown in FIG. 1.

In general, according to one embodiment, a memory system comprises a first storage device containing a non-volatile semiconductor memory and a controller configured to control the first storage device. Data from a data processor is written to the first storage device, the data is written to a second storage device. The controller transmits information indicating that data to be read is absent in the first storage device to the data processor when a read error occurs, the read error disables reading of data from the first storage device in response to a read request supplied from the data processor.

Embodiment

An embodiment will now be described with reference to drawings.

FIG. 1 schematically shows a memory system applied to this embodiment. An SSD 11 and an HDD 31 are connected to a data processor (to be referred to as a host hereafter) 21 such as a computer and the SSD 11 is used as a cache memory (to be referred to simply a cache as well) of the HDD 31. More specifically, the SSD 11 and HDD 31 are connected to the host 21 through an interface such as a Serial Advanced Technology Attachment (SATA), Serial Attached SCSI (SAS) or Peripheral Component Interconnect (PCI), not shown. Here, the memory system includes the SSD 11 itself, and a system constituted by the SSD 11, HDD 31, the host 21, etc., in combination.

As will be described later, the host 21 may be connected to another host through a network and the SSD 11 and HDD 31 can be used as remote storages of another host.

The host 21 comprises a data read/write unit 22 configured to control reading and writing of data from/to the SSD 11 and HDD 31. The data read/write unit 22 can be realized by, for example, a software program executing on the host 21. The data read/write unit 22, when, for example, it uses the SSD 11 as a file or cache of a block device, is realized as a part of an operating system or device driver, or when uses it as a data cache of a specific application, it is realized as a part of the application.

The SSD 11 contains, for example, a cache management unit 12, an error detection unit 13, an error correction unit 14 and a flash memory 15.

The cache management unit 12 as a control unit controls caching operation of the SSD 11, and is realized as, for example, a software program to be operated on the SSD 11. Specifically, the cache management unit 12 manages, for example, access of a cache region provided in the flash memory 15 and the storage capacity (hereinafter referred to as the capacity) of the cache region, which will be described later.

On writing data, the error detection unit 13 adds, for example, a cyclic redundancy code (CRC) to write data as an error detection code (EDC). Further, on reading data, the error detection unit 13 detects whether or not there is an error based on the error detection code contained in the read data.

On writing data, the error correction unit 14 adds an error correction code (ECC) to write data. Further, on reading data, the error correction unit 14 corrects the error contained in the read data based on the error correction code contained in the read data.

The error detection unit 13 and the error correction unit 14 are realized by, for example, software, hardware or a combination thereof to be operated on the SSD 11.

The flash memory 15 is constituted by a NAND flash memory, for example. But the embodiment is not limited to this, but some other memory can be used as will be described later.

FIG. 2A shows an example of the structure of a storage area of the flash memory 15. The flash memory 15 comprises, for example, a cache area 15a configured to store cache data and a management area 15b. The management area 15b contains management information such as lookup table (LUT) which indicates correspondence between a logical block address (LBA) supplied by the host 21 and a physical block address (PBA) in the flash memory 15. Management information is updated each time the data of the cache area 15a is rewritten.

Figure 2B:
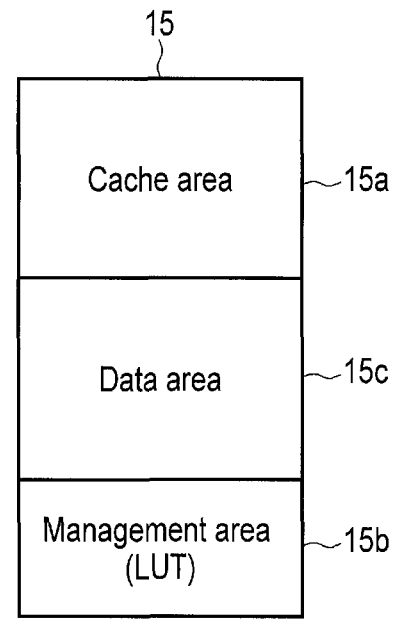
FIG. 2B shows another example of the memory area of the SSD.

FIG. 2B shows another example of the structure of the storage area of the flash memory 15. In the case of the example shown in FIG. 2B, the flash memory 15 includes a data area 15c for ordinary data, in addition to the cache area 15a and the management area 15b. With this structure, in the case of the example shown in FIG. 2B, the SSD 11 is used not only as a cache but also as a storage configured to store ordinary data. The management area 15b is configured to manage both the cache area 15a and the data area 15c.

Each area of the flash memory 15 comprises two or more blocks as an erase unit. Each block contains two or more memory cells. Cells selected simultaneously constitute at least one page, and data is written and read in units of pages.

The error correction unit 14 is configured to correct an error read from the flash memory 15, and there is only one error connection unit provided here. Note that the number of the error correction unit 14 is not limited to one, but the error correction unit 14 may be provided for each of the areas of the flash memory 15.

Figure 3:
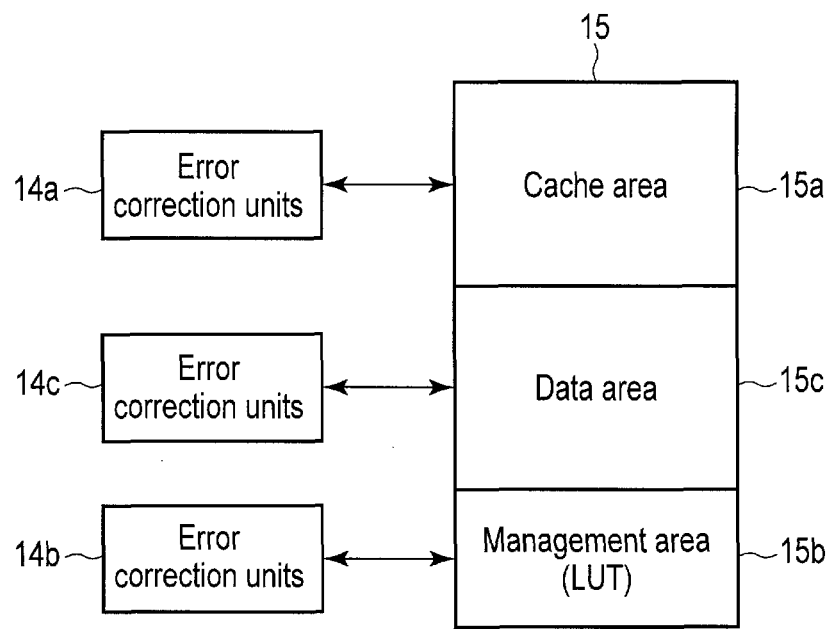
FIG. 3 is a schematic diagram showing a modification of an error correction unit of this embodiment, which corresponds to FIG. 2B.

FIG. 3 shows a case where two or more error correction units 14a, 14b and 14c are provided for the respective areas shown in FIG. 2B. More specifically, error correction units 14a, 14b, and 14c are provided to correspond to the cache area 15a, the management area 15b and the data area 15c of the flash memory 15, respectively. Error correction unit 14a corresponding to the cache area 15a achieves a first-strength error correction by means of a simple structure. Error correction unit 14b corresponding to the management area 15b has a second strength stronger than the first strength. Error correction unit 14c corresponding to the data area 15c has a third strength, which is stronger than the first strength and weaker than the second strength. That is, for example, BCH codes and Reed Solomon codes having many bits and being capable of high intensity of correction are applied to error correction unit 14b or error correction unit 14c; and, for example, Hamming codes having fewer bits and allowing high-speed processing are applied to error correction unit 14a. Note that the method for error correction is not limited to these, but can be modified.

When the SSD 11 has the structure shown in FIG. 2A, error correction unit 14a and error correction unit 14b are used excluding error correction unit 14c.

The HDD 31 comprises a storage area a management area, not shown. Write data is written to the storage area, and the management area manages a storage area.

(Operation)

Based on the above-described structure, the operations of the SSD 11, HDD 31 and the host 21 will now be described with reference to FIGS. 4 and 5. The following description is based on the assumption that the flash memory 15 has the structure shown in FIG. 2A.

(Data Write Process)

Figure 4:
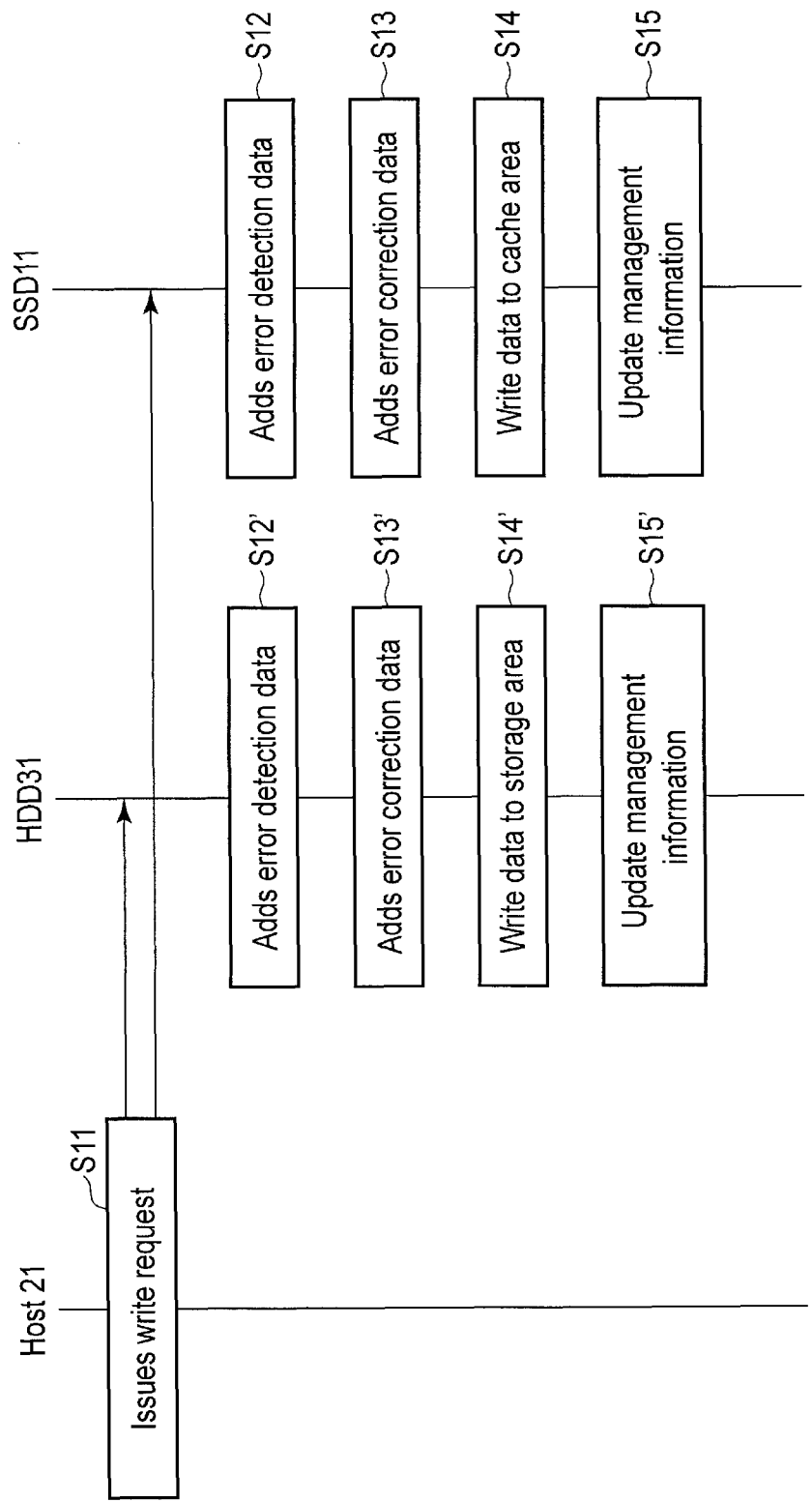
FIG. 4 is a sequence chart illustrating a write process of this embodiment.

As shown in FIG. 4, when the host 21 writes data to the HDD 31, the data read/write unit 22 issues a write request of writing the same data to the HDD 31 and SSD 11 (S11). That is, the data write is executed by the so-called write-through mode. More specifically, the host 21 writes the identical data to the HDD 31 and SSD 11 and therefore issues the identical commands. Here, the identical commands means that they have the same logical block address (LBA) same and the same data length, etc.

Upon receiving a write request, the cache management unit 12 of the SSD 11 writes data to the cache area 15a of the flash memory 15 via the error detection unit 13 and the error correction unit 14. That is, the error detection unit 13 adds an error detection codes to write data (S12), and the error correction unit 14 shown in FIG. 1 or error correction unit 14a shown in FIG. 3 adds an error correction code to write data (S13). The write data to which the error detection code and error correction code were added is written to the cache area 15a of the flash memory 15 (S14), and the management information of the management area 15b is updated (S15).

On the other hand, as in the case of the SSD 11, upon receiving the write request, an error detection code and an error correction code are added to write data on the HDD 31 (S12', S13'). This write data is written to the storage area of the HDD 31 (S14'), and the management information of the management area is updated (S15').

(Data Read Process)

As shown in FIG. 5, when the host 21 reads data, the data read/write unit 22 first issues a read request to the SSD 11 (S21). That is, the data read/write unit 22 issues a read command, a logical block address, data length, etc. to the SSD 11.

The cache management unit 12 of the SSD 11 which received the read request determines whether or not data for which the read request is received is present in the cache area 15a of the flash memory 15 (S22). That is, the cache management unit 12 searches through the management area 15b of the flash memory 15 to determine whether or not the requested data is present in the cache area 15a. When the result indicates that the data corresponding to the read request is not present in the cache area 15a, the cache management unit 12 notifies the host 21 of the cache miss as a read error (S23). Specifically, the cache management unit 12 transmits a return code of a protocol used in, for example, SATA, SAS or PCI to the host 21 as an acknowledgement to the read request from the host 21. A code indicating a cache miss is set in this return code.

On the other hand, when determined that the data is present in the cache area 15a, the data is read from the cache area 15a (S24). Then, the read data is subjected to error correction based on an error correction code (ECC) in the error correction unit 14 shown in FIG. 1 (or error correction unit 14a shown in FIG. 3) (S25). In this error correction, if excessively numerous errors to be corrected are detected, the cache management unit 12 notifies the host S21 of the cache miss as a read error (S26).

Further, if the error correction unit 14 could not find an error despite that it actually occurred, or failed to correct an error but it was determined that the error had been corrected, the error detection unit 13 detects the error based on an error detection code (EDC) (S27). When an error is detected as a result of this operation, the cache management unit 12 notifies the host 21 of the cache miss as a read error (S28).

Furthermore, when an error is not detected, the cache management unit 12 notifies the host 21 of the cache hit which indicates that the data is present in the SSD 11 (S29). Then, the data read from the cache area 15a is transmitted to the host 21 (S30).

On the other hand, the data read/write unit 22 of the host 21 determines if a notification supplied from the SSD 11 is a cache miss or a cache hit (S31). When the result indicates that the notification from the SSD 11 is a cache hit, the data read/write unit 22 captures and uses the data transmitted from SSD 11 (S32).

When determined that the notification from the SSD 11 is a cache miss, the data read/write unit 22 of the host 21 issues a read request to the HDD 31 (S33). This read request is, for example, a command which has a logical address and data length same as those of the read request issued to the SSD 11. The HDD 31 reads data in response to this read request and transmits it to the host 21 (S34). The host 21 captures and uses the data transmitted from the HDD 31 (S32).

As described above, when the host 21 accesses the SSD 11, the data read/write unit 22 designates the location of the data in the flash memory 15 by a logical block address (LBA). The SSD 11 manages the correspondence between an LBA and a physical block address (PBA) by LUT, and an LBA where data is present is associated in a block. An ordinary SSD has a predetermined storage capacity available to the user (capacity obtained by deducting the margin block from the capacity of the flash memory), and the capacity of the storage is the upper limit of LBA.

In contrast, as to the SSD 11 of this embodiment, the upper limit of the LBA is not specified, and therefore an arbitrary LBA can be designated. For example, when using the SSD 11 as a cache of a block device, the data read/write unit 22 uses the LBA of the HDD 31 directly as the LBA of the SSD 11. Therefore, when a cache miss occurs in the SSD 11, necessary data can be obtained by accessing the HDD 31.

In addition, when the data written by the host 21 exceeds the capacity of the flash memory 15, data with low access frequency is deleted by the cache management unit 12. Whether or not data has low access frequency can be determined by the system used for ordinary caches. Examples of the applicable determination system are Least Recently Used (LRU), Least Frequently Used (LFU), First In First Out (FIFO), and Adaptive Replacement Cache (ARC).

Deletion of data with low access frequency can be performed along with usual garbage collection of the SSD 11. Since the deletion of data with low access frequency and the garbage collection are performed simultaneously, it is possible to reduce wear on the flash memory and reduction of response speed, which may be caused by the garbage collection. Note that the garbage collection is a process which arranges invalid data within a block to make a free block.

According to this embodiment, a block with an increased error ratio due to wear can be used as long as read/write can be carried out. In this case, the hit ratio of the cache slightly decreases. On the other hand, blocks so heavily worn that it is difficult to detect errors, and those having become unreadable/unwritable are regarded as bad blocks (bad areas), and the use of these blocks is prohibited. When a bad block occurs, the capacity of the cache area 15a equivalent to the capacity of the bad block is reduced, and the capacity of the management area 15b is not reduced. More specifically, the blocks usable as the cache area 15a are reduced in number corresponding to the number of bad blocks. Thus, the capacity of the cache area 15a is managed, for example, by the cache management unit 12 corresponding to the number of bad blocks, and therefore the life of the SSD 11 can be prolonged.

Let us suppose the case where the flash memory 15 is of the structure shown in FIG. 2B. In this case, when a write request issued and a read request issued from the host 21 are changed over between the case where the cache area 15a is accessed and the case where the data area 15c is accessed, the cache management unit 12 can access the cache area 15a and the data area 15c while distinguishing these regions from each other.

In the meantime, when a bad block occurs in the flash memory 15 comprising an ordinary data area 15c and a cache area 15a as shown in FIG. 2B, the capacity of the cache area 15a is reduced according to the bad block. Thus, the capacity of the ordinary data area 15c is not reduced, and therefore the life of the SSD 11 can be prolonged.

(Effect)

According to the above-described embodiment, the SSD 11 comprises the cache management unit 12 and the cache area 15a in the flash memory 15, and when writing data, the same data is written to the cache area 15a of the flash memory 15 of the SSD 11, and the HDD 31 by the write-through system. When reading data, a read request is first issued by the host 21 to the SSD 11, and data is read from the cache area 15a of the flash memory 15 according to this read request. In reading the data, when such a read error occurs, that data is not present, data cannot be corrected or an error is detected based on an error detection code, the cache management unit 12 notifies the host 21 as a cache miss. The host 21 notified of the cache miss obtains data corresponding to the read request by newly reading the data from the HDD 31 as a master.

Generally, a cache is processed by the host to which the SSD is connected, and the SSD does not distinguish whether the written data is cache data or other data. In contrast, in this embodiment, since the SSD 11 comprises a cache management unit 12 as described above, and the cache management unit 12 manages access to the cache area 15a and response to the host 21, the processing by the host 21 can be reduced.

Here, generally, if write is repeated on a block of the flash memory used by the SSD, the error ratio gradually increases because of wear. This error can be corrected using the ECC, but when the error ratio increases to such a level that it is difficult to correct, a block containing memory cells having a high error ratio cannot be used because of its being a bad block. The reduction in capacity due to the bad block can be compensated for by a spare block, but when the spare blocks are used up, the SSD can no longer be written to. As a result, there may be cases where the SSD can no longer be used even though many blocks are still usable. The life of the SSD can be prolonged by increasing the number of spare blocks, but increasing the number of spare blocks raises the cost.

In contrast, in this embodiment, the cache area 15a of the SSD 11 is managed by the cache management unit 12 and therefore blocks with a high error ratio can be continuously used. In this case, the hit ratio of cache slightly decreases, but the operation of the memory system is not significantly affected by reading data from the HDD 31. Therefore, the life of the SSD 11 can be prolonged while suppressing the increase in cost.

Further, in this embodiment, the capacity of the SSD 11 is managed by the cache management unit 12, and blocks with remarkably high error ratios are inhibited from using as defective blocks. Thus, the capacity of cache is reduced by the equivalent amount of the bad blocks. Here, the hit ratio of cache decreases, but the operation of the memory system is not significantly affected by reading data from the HDD 31. Also the capacity of the management area 15 is not reduced, and therefore important data which must not be erased can be reliably managed. Thus, the SSD 11, which may contain bad blocks, can be continuously used.

In a general SSD, the capacity of a storage and data to be stored in the storage is managed on the host side, and these items cannot be changed by the SSD. According to this embodiment, since the cache management unit 12 is provided in the SSD 11, the capacity of the cache area 15a and the management of the data stored in the SSD 11 can be changed. In this manner, the SSD 11 can be flexibly managed.

Furthermore, in the case of the SSD 11 comprising the data area 15c which stores the ordinary data and the cache area 15a, the capacity of the data area 15c is not reduced according to the number of bad blocks but the capacity of the cache area 15a is reduced by the equivalent amount of the bad blocks. Therefore, the life of the SSD 11 can be prolonged.

Further, error correction units 14a, 14b and 14c are provided in the cache area 15a, the management area 15b and the data area 15c of the flash memory 15, respectively. With this structure, the management area 15b is subjected to error correction of the second strength, the cache area 15a is subjected to error correction of the first strength weaker than the second strength, and the data area 15c is subjected to error correction of the third strength stronger than the first strength but weaker than the second strength. Therefore, as compared to the case where the entire region is subjected to error correction of a high intensity, the number of bits necessary for the error correction can be reduced. Consequently, the cost of the flash memory can be reduced.

Furthermore, when in a next-generation NAND flash memory in which there is further miniaturization of memory cells, or when planar NAND technology gives way to three-dimensional NAND technology, it is expected that the data retention capability will change, thereby increasing the error ratio. Here as well, in this embodiment, the flash memory 15 is managed by the cache management unit 12, and therefore the life of the SSD 11 can be prolonged.

Moreover, also in the case where some other nonvolatile memory is used in place of the NAND flash memory for memory cells, the data retention capability may change, thereby increasing the error ratio. Here as well, the life of the SSD 11 can be prolonged by performing similar management by the cache management unit 12.

(Specific Example of SSD)

FIG. 6 shows an example of the SSD to which this embodiment is applied. In FIG. 6, identical structural parts are designated by the same reference numbers or symbols.

The cache management unit 12 of the SSD 11 shown in FIG. 1 corresponds to, for example, CPU 43B of a back end 4B shown in FIG. 6 and the program which operates the CPU 43B. The error detection unit 13 and the error correction unit 14 shown in FIG. 1 correspond to, for example, an ECC 49 shown in FIG. 6. The flash memory 15 shown in FIG. 1 corresponds to a NAND memory 15 shown in FIG. 6.

In FIG. 6, the controller 4 comprises a front end 4F and the back end 4B.

The front end (host communication unit) 4F comprises a host interface 41, a host interface controller 42, an encoding/decoding unit 44 and a CPU 43F.

The host interface 41 communicates with the hosts 21 to transmit/receive various kinds of requests, LBA, data, etc. The requests include a write command, a read command, a delete command, etc.

The host interface controller 42 controls communications of the host interface 41 under control of the CPU 43F.

In writing data, the encoding/decoding (Advanced Encryption Standard [AES]) unit 44 encrypts write data supplied from the host interface controller 42 and supplies the data to the write buffer WB of the back end 4B. In reading data, the AES unit 44 decrypts the encrypted read data transmitted from the read buffer RB of the back end 4B. Note that, if necessary, write data and read data can be transmitted while bypassing the AES unit 44.

The CPU 43F controls the host interface 41, the host interface controller 42 and the AES unit 44 of the front end 4F, and controls the operation of the entire front end 4F.

The back end 4B comprises a write buffer WB, a read buffer RB, a lookup table (LUT) 45, a double data rate controller (DDRC) 46, a dynamic random access memory (DRAM) 47, a direct memory access controller (DMAC) 48, an error checking and correction (ECC) 49, a randomizer RZ, a NAND controller (NANDC) 50 and a CPU 43B.

The write buffer WB temporarily stores the write data transmitted from a host 21. More specifically, the write buffer WB temporarily stores data until the write data becomes a predetermined data size appropriate for the NAND memory 15.

The read buffer RB temporarily stores the read data read from the NAND memory 15. More specifically, in the read buffer RB, the read data is rearranged so that it is in an order suitable for the host 21 (the order of the logical block address (LBA) designated by the host 21).

The LUT 45 is data for converting a logical block address (LBA) into a physical block address (PBA). The DDRC 46 controls a double data rate (DDR) in the DRAM 47. The DRAM 47 is a nonvolatile memory configured to store the LUT 45, for example. The DMAC 48 transmits write data, read data, etc., via an internal bus IB.

FIG. 6 shows one DMAC 48, but the controller 4 may contain two or more DMACs 48. If necessary, the DMACs 48 can be set to various locations in the controller 4.

The ECC 49 adds an error correction code to the write data transmitted from the write buffer WB. When the ECC 49 transmits the data read from the NAND memory 15 to the read buffer RB, the data is corrected if needed, using the error correction code added to the data.

In writing data, the randomizer RZ (also referred to as a scrambler) disperses write data so as not to unevenly distribute write data in a specific page or in a word line direction, etc., of the NAND memory 15. Thus, the number of writes can be leveled by dispersing the write data, and therefore the life of the memory cells MC of the NAND memory 15 can be prolonged. In this manner, the reliability of the NAND memory 15 can be improved. Further, in reading data, the read data read from the NAND memory 15 passes through the randomizer RZ.

In order to satisfy the demand of a predetermined speed, the NANDC 50 accesses the NAND memory 15 in parallel using two or more channels (four channels CH0 to CH3 in this example).

The CPU 43B controls each of the above-described structural members (45 to 50, RZ) of the back end 4B, and controls the operation of the entire operation of the back end 4B.

Note that the structure of the controller 4 shown in FIG. 6 is only an example, and the embodiment is not limited to this structure.

Further, to the SSD 11, different types of NAND memory such as those having a different design rule, or planer NAND memory and three-dimensional NAND memory may be applicable. In addition, some other nonvolatile memory, for example, a magnetoresistive RAM (MRAM) may be applicable as well.

(Modification)

FIG. 7 shows the case where this embodiment is applied to a host and storage array connected to a network.

For example, a first host 61 as a client, a second host 62 as a server and a storage array 63 are connected to a network 64.

For example, an SSD 65 and an HDD 66 are connected to the second host 62, and, for example, an SSD 67 and an HDD 68 are connected to the storage array 63. The structure of the SSDs 65 and 67 is similar to that shown in FIG. 1 and contains the cache control unit (CM) 12.

The number of HDDs and SSDs connected to the second host 62 and the storage array 63 is not limited to that shown in FIG. 7, and can be changed according to the use.

The first host 61 and the second host 62 are each a data processor and the second host 62 contains a data read write unit (DRW) 22 as in the case of the host 21 shown in FIG. 1.

As the storage array 63, a storage area network (SAN), for example, is known, although it is not limited to this. This storage array 63 is provided, for example as a cloud storage.

FIG. 8 schematically shows an example of the storage array 63. The storage array 63 comprises, for example, network interface 63*a*, RAID controller 63*b* and interface 63*c* with the storage. The SSD 67 and HDD 68 are connected to the interface 63*c*. Interface 63*c* contains the data read/write unit 22 shown in FIG. 1.

In connection with the structure above, when a read request is issued to the second host 62 through the network 64 from the first host 61, the data read/write unit 22 of the second host 62 first accesses the SSD 65 as described above. When a response from the cache management unit 12 of the SSD 65 indicates a cache miss, the second host 62 issues a read request to the HDD 66 and reads necessary data therefrom. Thus, the data read into the second host 62 is transmitted to the first host 61 through the network 64.

Meanwhile, when a read request is issued to the storage array 63, for example, through the network 64 from the first host 61, the data read/write unit 22 of the storage array 63 accesses the SSD 67 first. When the response from the cache management unit 12 of the SSD 67 indicates a cache miss, the storage array 63 issues a read request to the HDD 68 and reads necessary data therefrom. Thus, the data read into the storage array 63 is transmitted to the first host 61 through the network 64.

When a write request is issued to the second host 62 through the network 64 from the first host 61, the data read/write unit 22 of the second host 62 writes the same data to the SSD 65 and HDD 66 by the write-through system as described above.

When a write request is issued to the storage array 63 through the network 64 from the first host 61, the data read/write unit 22 of the storage array 63 writes the same data to the SSD 67 and HDD 68 by the write-through system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a first storage device comprising a nonvolatile semiconductor memory; and
    a controller configured to control the first storage device, wherein
    data from a data processor is written to the first storage device, the data is written to a second storage device, and
    the controller transmits information indicating that data to be read is absent in the first storage device to the processor when a read error occurs, the read error disables reading of data from the first storage device in response to a read request supplied from the data processor.

2. The system according to claim 1, wherein the first storage device comprises at least a cache region and a management area.

3. The system according to claim 2, wherein the controller reduces, when the first storage device contains a bad area, the cache region by storage capacity equivalent to the storage capacity of the bad area.

4. The system according to claim 2, further comprising:
    a first error correction unit configured to correct a first error in data read from the cache region; and
    a second error correction unit configured to correct a second error in data read from the management area.

5. The system according to claim 4, wherein the first error correction unit is configured to perform error correction of a first strength, and the second error correction unit is configured to perform that of a second strength stronger than the first strength.

6. The system according to claim 5, wherein the first storage device includes a data area.

7. The system according to claim 6, further comprising
    a third error correction unit configured to correct a third error in data read from the data area, the third error correction unit performing error correction of a third strength stronger than the first strength but weaker than the second strength.

8. The system according to claim 7, further comprising:
    an error detection unit configured to detect a fourth error in data read from the first storage device based on an error detection code.

9. The system according to claim 1, wherein the read error includes that data to read is absent in the first storage device.

10. The system according to claim 4, wherein the read error includes that an error in the data read from the first storage device is uncorrectable by the error correction unit.

11. The system according to claim 8, wherein the read error includes that an error is detected in data read from the first storage device by the error detection unit.

12. The system according to claim 1, wherein the information indicating that data is absent in the first storage device is information indicating a cache miss.

13. The system according to claim 1, which constitutes a storage array.

* * * * *